(12) United States Patent
Araki et al.

(10) Patent No.: US 7,280,290 B2
(45) Date of Patent: Oct. 9, 2007

(54) MOVABLE LENS MECHANISM

(75) Inventors: Shinichi Araki, Sunnyvale, CA (US); Christopher B. Allenby, Santa Clara, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 11/072,097

(22) Filed: Mar. 3, 2005

(65) Prior Publication Data

US 2006/0056076 A1 Mar. 16, 2006

Related U.S. Application Data

(60) Provisional application No. 60/610,439, filed on Sep. 16, 2004.

(51) Int. Cl.
*G02B 7/02* (2006.01)

(52) U.S. Cl. ............... 359/811; 359/823; 359/824; 369/44.15; 369/44.16; 396/79; 362/455; 353/101

(58) Field of Classification Search ............... 359/823, 359/824, 811; 369/44.15, 44.16; 396/79; 362/455; 353/101
See application file for complete search history.

(56) References Cited

U.S. PATENT DOCUMENTS

| | | | | |
|---|---|---|---|---|
| 3,987,676 A | * | 10/1976 | Bennewitz | 73/335.03 |
| 4,385,373 A | * | 5/1983 | Howe | 369/44.15 |
| 5,500,761 A | * | 3/1996 | Goossen et al. | 359/290 |
| 6,107,726 A | * | 8/2000 | Near et al. | 310/328 |
| 2004/0017620 A1 | * | 1/2004 | Kaneko et al. | 359/824 |

* cited by examiner

*Primary Examiner*—Hung Dang
*Assistant Examiner*—Joseph Martinez
(74) *Attorney, Agent, or Firm*—Charles J. Kulas; Trellis Intellectual Property Law Group, PC

(57) ABSTRACT

Disclosed is a lens mechanism made of a flexible support with a lens positioned on the support. A sensor is positioned below the lens so that it senses photons passing through the lens. At least one actuator is positioned around the lens such that a change in an electric charge on the actuator causes the lens to move. In one embodiment, the lens moves along its optical axis. In another embodiment, the lens moves so that its optical axis tips from the original orientation. In yet another embodiment, the lens moves due to a change in electric charge on an electrostatic charge layer that is substantially coincident with the lens. Embodiments of the invention can provide a dynamic actuator mechanism for positioning a small lens.

26 Claims, 4 Drawing Sheets

MOVABLE LENS MECHANISM

RELATED APPLICATIONS

This application claims the benefit of U.S. Provisional Application No. 60/610,439, entitled "Movable Lens Mechanism", filed Sep. 16, 2004, which is incorporated herein by reference in its entirety.

BACKGROUND

This invention is related in general to microelectronic devices and more specifically to a microelectromechanical system (MEMS) zoom lens.

MEMS devices are desirable because of their small size, potential lower cost, and higher performance. Some types of devices that have been built using MEMS techniques include accelerometers, gyroscopes, temperature sensors, chemical sensors, atomic force microscope (AFM) probes, micro-lenses, combdrive actuators, piezoelectric actuators. As imaging devices become increasingly smaller, it is desirable to have a small, movable lens mechanism that can be integrated into a miniature imaging system. Such a lens would provide, for example, image zoom and focus capabilities.

SUMMARY

In one embodiment, a lens mechanism is made of a flexible support with a lens positioned on the support. A sensor is positioned below the lens so that it senses photons passing through the lens. At least one actuator is positioned around the lens such that a change in an electric charge on the actuator causes the lens to move. In one embodiment, the lens moves along its optical axis. In another embodiment, the lens moves so that its optical axis tips from the original orientation. In yet another embodiment, the lens moves due to a change in electric charge on an electrostatic charge layer that is coupled to the lens One embodiment provides an apparatus comprising: a flexible support; a lens supported by the flexible support, the lens being aligned with a first plane; a sensor positioned to receive photons passing through the lens; and an actuator positioned such that a change in an electric charge on at least a portion of the actuator causes the lens to move to be aligned with a second plane, the second plane being substantially parallel to the first plane.

Another embodiment provides an apparatus comprising: a flexible support; a lens supported by the flexible support, the lens being aligned with a first plane; a sensor positioned to receive photons passing through the lens; and an actuator positioned such that a change in an electric charge on at least a portion of the actuator causes the lens to move to be aligned with a second plane, the second plane intersecting the first plane.

Another embodiment provides an apparatus comprising: a flexible support; a lens supported by the flexible support, the lens being aligned with a first plane; a sensor positioned to receive photons passing through the lens; and an electrostatic layer positioned adjacent the lens such that a change in an electric charge on at least a portion of the electrostatic layer causes the lens to move to be aligned with a second plane, the second plane being substantially parallel to the first plane.

Another embodiment provides an apparatus comprising: a flexible support; a lens supported by the flexible support, the lens being aligned with a first plane; a sensor positioned to receive photons passing through the lens; and an electrostatic layer positioned adjacent the lens such that a change in an electric charge on at least a portion of the electrostatic layer causes the lens to move to be aligned with a second plane, the second plane intersecting the first plane.

Embodiments of the invention can provide a dynamic actuator mechanism for positioning a small lens.

DETAILED DESCRIPTION

Figure 1:
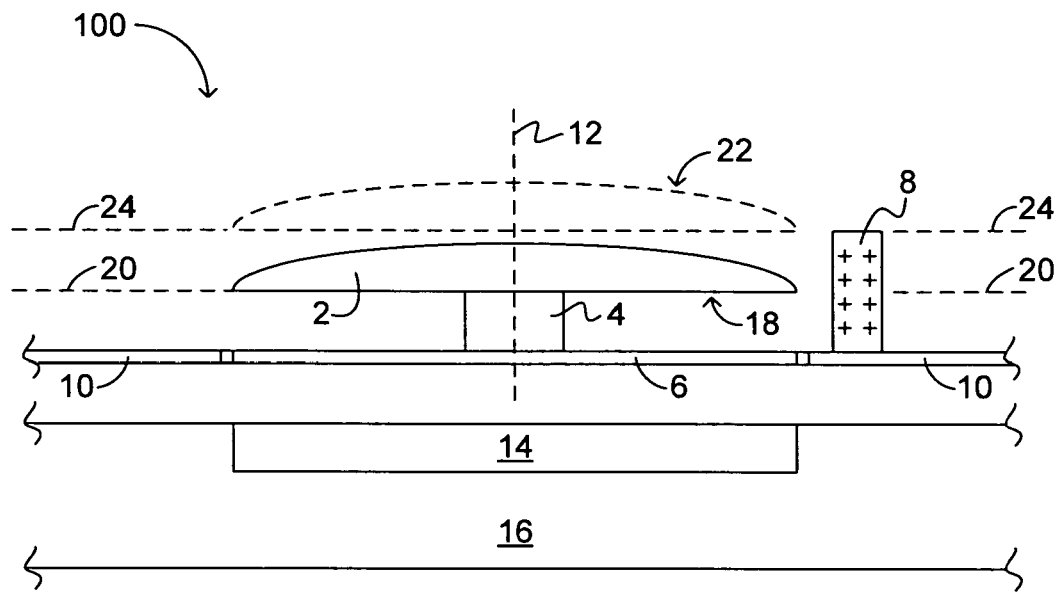
FIG. 1 is a schematic cross-sectional view that illustrates a lens mechanism in accordance with an embodiment of the present invention.

In the drawings, like numbers designate like or substantially similar drawing elements. Well-known elements (e.g., power supplies, electrically conductive lines, etc.) are omitted so as to more clearly show the invention.

Figure 2:
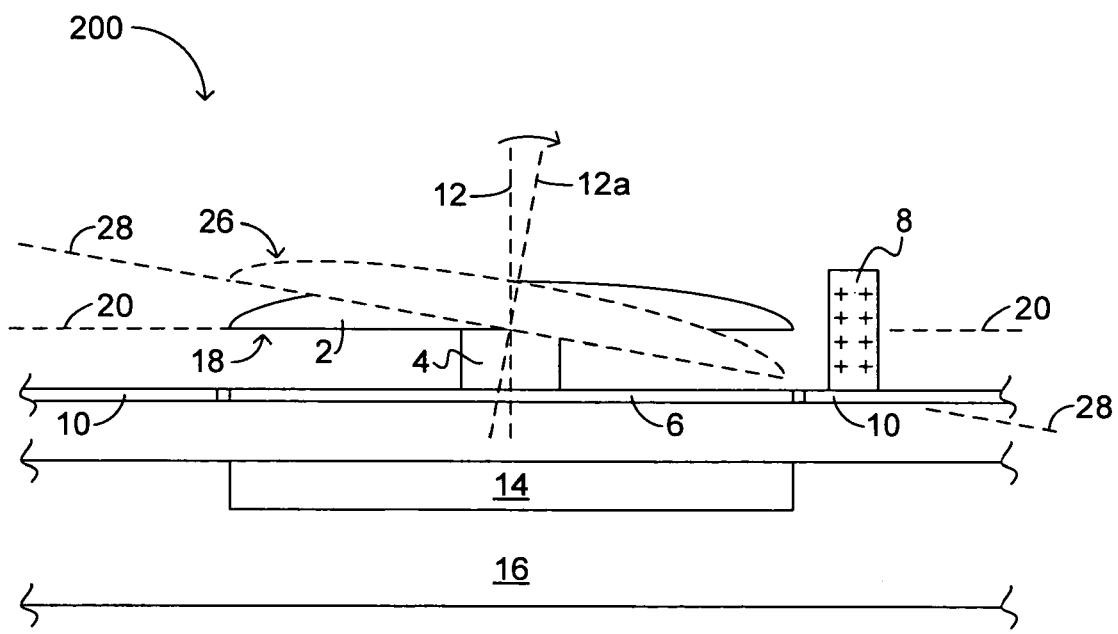
FIG. 2 is a schematic cross-sectional view that illustrates a lens mechanism in accordance with another embodiment of the present invention.

Referring now to FIG. 1, a schematic cross-sectional view illustrating a lens mechanism in accordance with an embodiment of the present invention is indicated by the general reference character 100. Lens 2 is positioned on lens support post 4 that rests on flexible support 6. As shown in FIG. 2, lens 2 is a convex lens having a curved top surface farthest from the underlying sensor and a flat bottom surface nearest the underlying sensor. The shape of lens 2 is illustrative of various single and compound lens shapes and/or combinations of lenses. Electrostatic actuator 8 is positioned near the edge of lens 2. In one embodiment, actuator 8 is a stacked metal oxide semiconductor (MOS) device that can hold an electrostatic charge (illustrated by several "+" symbols; either positive or negative charge may be used) at various positions relative to the edge of lens 2. In an alternate embodiment, actuator 8 may include one or more magnets or magnetic material for magnetic-based control of lens movement. A base 10 supports both flexible support 6 and electrostatic actuator 8. Lens 2 has an optical axis 12, on which exists a focus of lens 2. Sensor 14 (e.g., an array of charge-coupled devices (CCDs), or complementary metal oxide semiconductors (CMOS), or both together) is positioned such that sensor 14 senses electromagnetic (photon) energy (e.g., visible light, infrared, ultraviolet, etc.) passing through lens 2. Sensor 14 is positioned in or on substrate 16 (e.g., silicon semiconductor wafer). As shown in FIG. 1, lens 2 is in a first position 18 and is aligned with geometric plane 20. Optical axis 12 is therefore substantially perpendicular to geometric plane 20.

In accordance with embodiments of the present invention, if the amount and/or polarity of electrostatic charge on actuator 8 changes, lens 2 moves as a result. As shown in FIG. 1, in one embodiment lens 2 moves upward, away from sensor 14, from position 18 to position 22 if the electrostatic charge changes on actuator 8. In this illustrative embodiment, several additional actuators 8 (not shown) are positioned around the edge of lens 2 such that a substantially equal change in charge on each unique actuator 8 causes lens 2 to remain substantially parallel to geometric plane 20. Therefore, in this illustrative embodiment, in position 22, lens 2 is aligned with another geometric plane 24. Optical axis 12 is substantially perpendicular to geometric plane 24, and therefore geometric plane 24 is substantially parallel to geometric plane 20. For clarity in the drawing, flexible support 6 is not shown in a new position, but it is understood that flexible support 6 moves to allow lens 2 to move. In some embodiments, charge on actuator 8 is changed to cause lens 2 to move downward, closer to sensor 14, from position 18. Flexible support 6 is described in greater detail below with reference to FIG. 5.

As shown in FIG. 1, lens 2 moves so that, for example, an image focus or magnification changes with respect to sensor 14. The focus and/or magnification changes as the charge on actuator 8 changes. Such focus and/or magnification change is a useful feature in, for instance, a camera such as those incorporated into cellular telephone handsets.

Referring now to FIG. 2, a schematic cross-sectional view illustrating a lens mechanism in accordance with another embodiment of the present invention is indicated by the general reference character 200. The structural elements shown in FIG. 2 are substantially the same as in FIG. 1. FIG. 2 illustrates that lens 2 can be moved such that optical axis 12 tips from its original orientation to new orientation 12a. As shown in FIG. 2, a change in the electrostatic charge on actuator 8 causes lens 2 to move from position 18 to position 26. In one embodiment, moving lens 2 from position 18 to position 26 is done by changing the electrostatic charge on a single actuator 8. In accordance with other embodiments, moving lens 2 from position 18 to position 26 is done by changing the electrostatic charge on two or more unique actuators 8 (not shown) by different amounts. In position 26, lens 2 is aligned with geometric plane 28, and the new optical axis is shown as 12a. Optical axis 12a for position 26 is not substantially perpendicular to geometric plane 20, as optical axis 12 is for position 18. Therefore, geometric plane 28 intersects geometric plane 20. It can be seen that lens 2 may be tipped in various directions, depending on the positions and/or changes in charge on two or more actuators 8 positioned around lens 2.

As illustrated in FIGS. 1 and 2, lens 2 moves so that, for example, the position of an image is moved with respect to the sensing surface of sensor 14. In this fashion, the position of an image with reference to sensor 14 is controlled by changes in actuator 8 charge. Such position variations include movement through substantially parallel planes as well as tipping in various directions.

Figure 3:
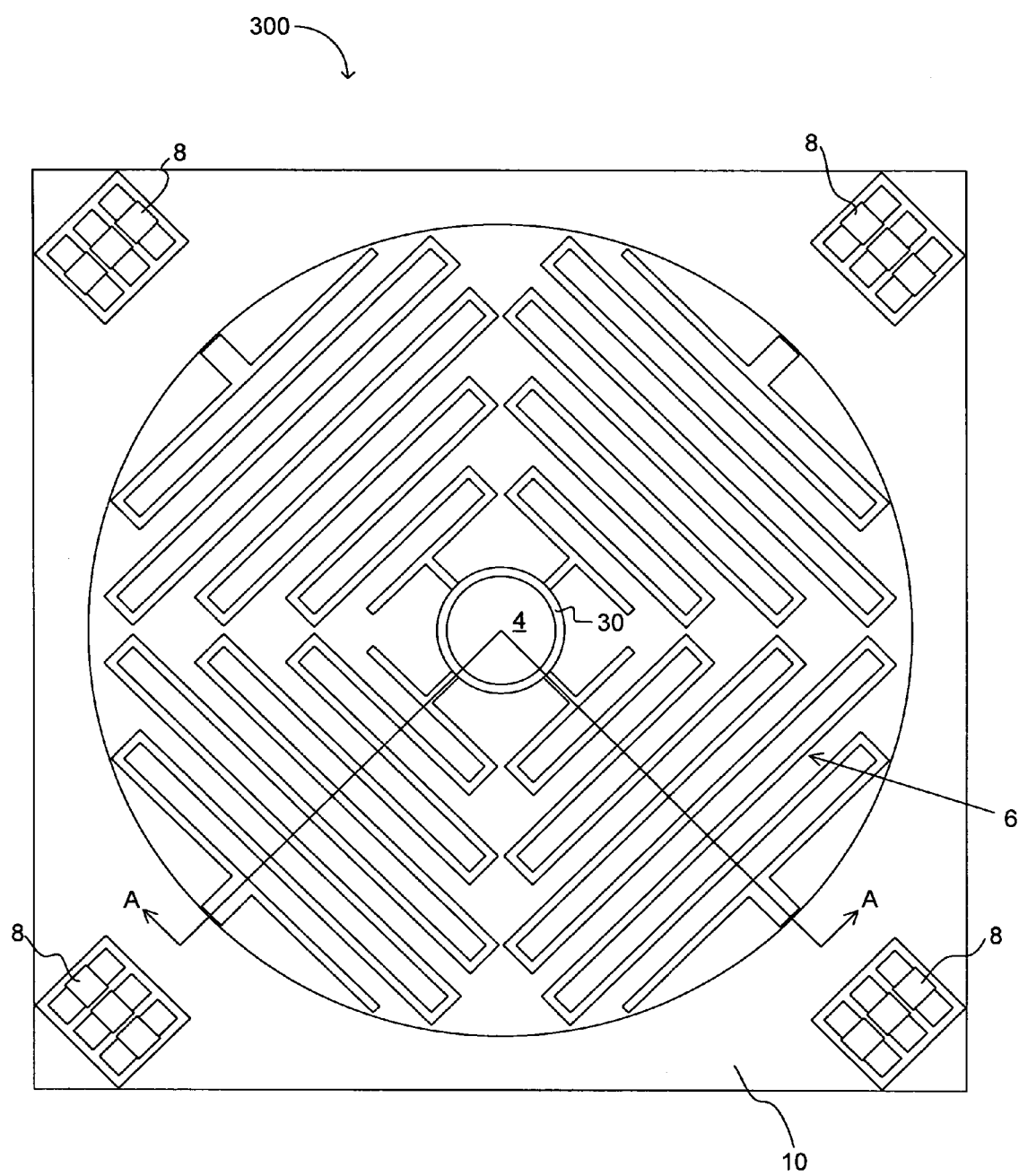
FIG. 3 is a schematic top plan view of a lens mechanism in accordance with embodiments of the present invention.

Referring now to FIG. 3, a schematic top plan view of a lens mechanism in accordance with embodiments of the present invention is shown and indicated by the general reference character 300. The view in FIG. 3 is downwards through lens 2 along a path that light travels to be incident on sensor 14, for example. As shown in FIG. 3, flexible support 6 is made of several (four are shown) serpentine-shaped elements extending from base 10 inwards to a center support portion 30. The substantially serpentine-shaped elements are illustrative of various flexible support shapes that may be used that allow lens 2 to move along its optical axis, as shown in FIG. 1, to tip its optical axis, as illustrated in FIG. 2, or both move and tip together. In the embodiments shown, flexible support 6 is resilient such that lens 2 returns to the same position when substantially no charge is on the one or more actuators 8. Other less resilient materials may be used in other embodiments, in which case lens 2 is kept in position at all times by charge on the one or more actuators 8. In some embodiments, flexible support 6 is made to be transparent (either due to material properties or thickness, or both). In other embodiments, the image area blocked by flexible support 6 is small enough so as to not be a concern relative to the overall image falling on underlying sensor 14. Lens support post 4 is likewise made transparent enough or small enough to not materially affect the desired sensing. Lens support post 4 is positioned on center support portion 30, and lens 2 is positioned over lens support post 4. A transparent electrostatic layer, discussed in detail below, is positioned under lens 2 and over support post 4. As shown in FIG. 3, four actuators 8 are positioned on base 10 to be equally spaced around lens 2 and the underlying electrostatic layer.

Figure 4:
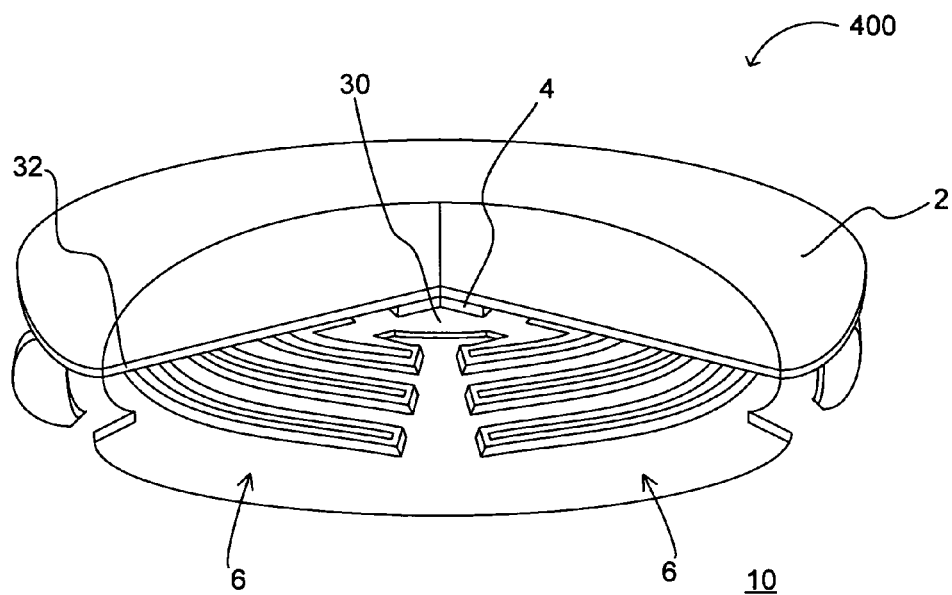
FIG. 4 is a schematic perspective cutaway view of a lens mechanism in accordance with embodiments of the present invention.

Referring now to FIG. 4, a schematic perspective cutaway view of a lens mechanism in accordance with embodiments of the present invention is shown and indicated by the general reference character 400. The view of FIG. 4 is taken generally along cut line A-A of FIG. 3. Actuators 8 are omitted from FIG. 4 for clarity. In some embodiments, flexible support 6 is fabricated from the same one or more layers that make base 10. In other embodiments, flexible support 6 is fabricated from material different from base 10. In one embodiment, flexible support 6 is made of optically transparent glass, such as nitride glass (SiN).

FIG. 4 shows substantially transparent electrostatic layer 32 positioned under lens 2. In other embodiments, electrostatic layer 32 may be positioned over, or between portions of, lens 2. Electrostatic layer 32 receives (electrically conductive traces are not shown) and holds an electrostatic charge. Electrostatic layer 32 may be constructed of niobium oxide ($Nb_xO_y$), for example. Lens 2 is made to move by changing the amount or polarity of charge on either or both electrostatic layer 32 and one or more actuators 8. The charge differential between the charges on electrostatic layer 32 and on the one or more actuators 8 determines the movement amount and direction of lens 2. Of course, electrostatic layer 32 may be another shape, such as a square or other shape as suitable for a particular implementation. Further, opposite charge polarities may be stored on opposing sides. For example, if support post 4 is made of $Nb_xO_y$ instead of SiN (which is a dielectric), both "+" and "−" polarities can be used. One or more transistors can be used to provide the positive and negative biases. Charge may, for example, flow through electrostatic layer 32 to support post 4 to flexible support 6 to a ground line.

Figure 5:
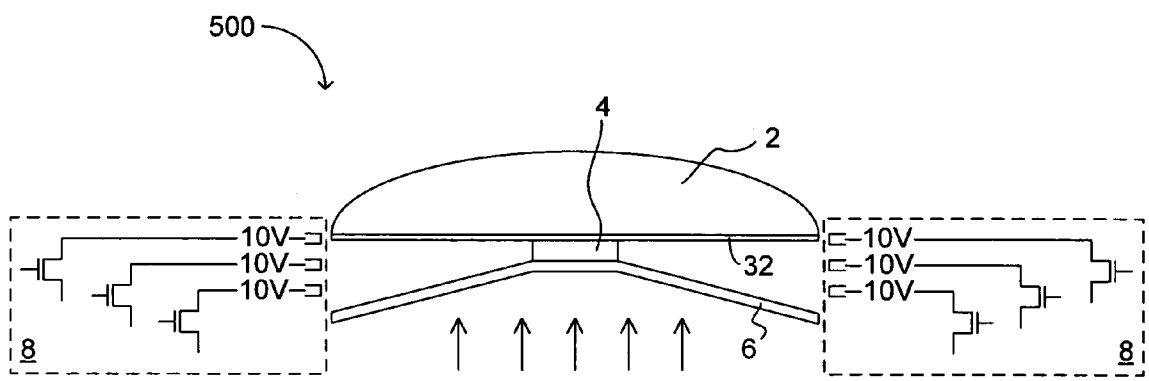
FIG. 5 is a schematic cross-sectional view that illustrates lens movement on a flexible support in accordance with embodiments of the present invention.

Referring now to FIG. 5, a schematic cross-sectional view illustrating lens movement on a flexible support according to embodiments of the present invention is indicated by the general reference character 500. FIG. 5 shows an embodiment of lens 2 as it moves on flexible support 6. FIG. 5 illustrates the relation between electrostatic layer 32 and the one or more actuators 8. As discussed above, a change in charge position and/or amount in an actuator 8 causes lens 2 to move upwards as flexible support 6 flexes and adapts. In the example shown, MOS transistors may be used to implement actuator 8 by allowing different levels of charge to be applied, such as one, two, or three times a baseline amount of charge. The total charge may be in linearly distributed increments. Accordingly, actuator charge may be varied in discrete increments. Alternatively, a continuous charge control on the actuator may be employed. Thus, analog or digital charge control means can be used.

As shown in FIG. 5, the distance between electrostatic layer 32 and the actuator 8 charge points (e.g., charged regions of MOS transistors) is relatively small. In another embodiment, the electrostatic repulsive force between electrostatic layer 32 and the actuator 8 charge points is large enough to cause the edge of lens 2 to move above the top of one or more actuators 8. In some embodiments an attractive electrostatic force exists between actuators 8 and electrostatic layer 32, in others a repulsive force exists, and in still others a combination of attractive and repulsive forces exists. In some embodiments one charge polarity is placed at one end of a single actuator 8, and the opposite charge polarity is placed at the opposite end of the single actuator 8. In other embodiments, one or more actuators 8 have one charge polarity and another one or more of actuators 8 have the opposite charge polarity.

In one embodiment, lens 2 is made of optically transparent glass, such as silicon oxide ($SiO_2$). Also, support post 4 and flexible support 6 are in one embodiment made of optically transparent glass, such as nitride glass (SiN). Electrostatic layer 32 may be constructed of niobium oxide ($Nb_xO_y$). Other materials used to fabricate semiconductor and/or microelectromechanical (MEM) machines may be used for these and the other structures shown and described, and fabrication may be done using known semiconductor and MEM machine fabrication procedures.

The space surrounding lens 2 may be filled with air, other gas, or may be a substantial vacuum. In some embodiments the lens apparatus is sealed from the ambient environment, and in other embodiments the lens apparatus is open to the ambient environment. The charges on actuators 8 may be variable by discrete or continuous amounts, controlled by either digital or analog control signals. In some embodiments, the charge position is moved on the one or more actuators 8, such as by charging two or more address electrodes in an addressable circuit (not shown). Control circuitry (not shown) for the actuators 8 may be formed in or on a portion of base 10, or may be separate from base 10.

Figure 6:
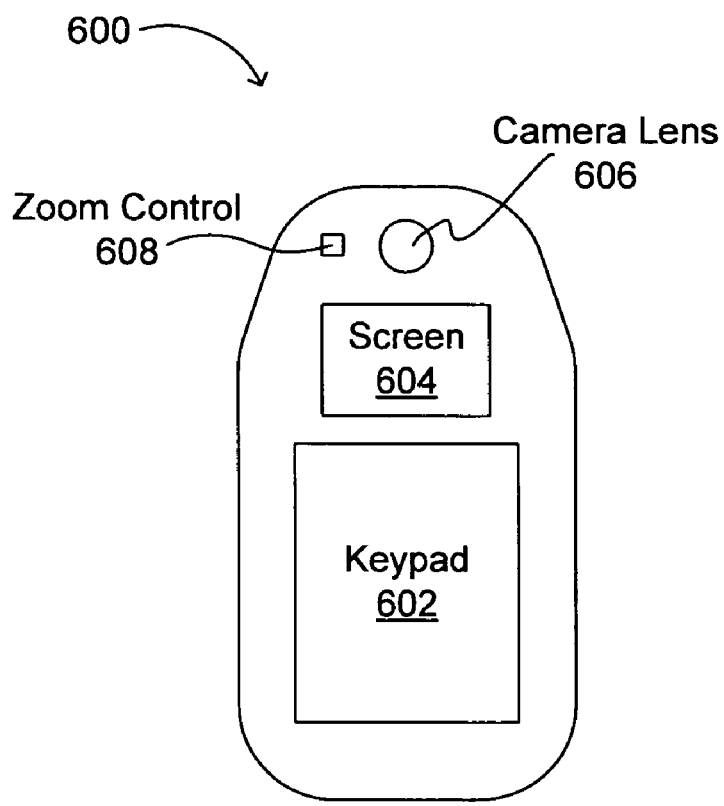
FIG. 6 is a diagram of a cellular telephone application that can be used in accordance with embodiments of the present invention.

Referring now to FIG. 6, a diagram of a cellular telephone application that can be used in accordance with embodiments of the present invention is shown and indicated by the general reference character 600. The exemplary cellular telephone shown can include standard features, such as keypad 602 and display screen 604, and is generally capable of capturing still images or moving images, or both. In addition, camera lens 606 can be included for digital pictures. Camera lens 606 may be, for example, lens 2 as described herein. Further, zoom control 608 can be included to control the position of camera lens 606 in accordance with embodiments of the present invention. Zoom control may also be implemented via keypad 602 or other control, such as touch screen, or automatic camera focusing. If a zoom control 608 button is employed, the button can activate a zooming via a movement of camera lens 606. For example, zoom control may activate one or more actuators 8 so as to effect movement of camera lens 606 for zooming, as discussed above. While an exemplary stand-alone camera has been shown, camera lens 606 and zoom control 608 may be incorporated into various other electronic devices in accordance with embodiments. Further, zoom control 608 may also be used to control image focus in either a manual or an automatic fashion.

Figure 7:
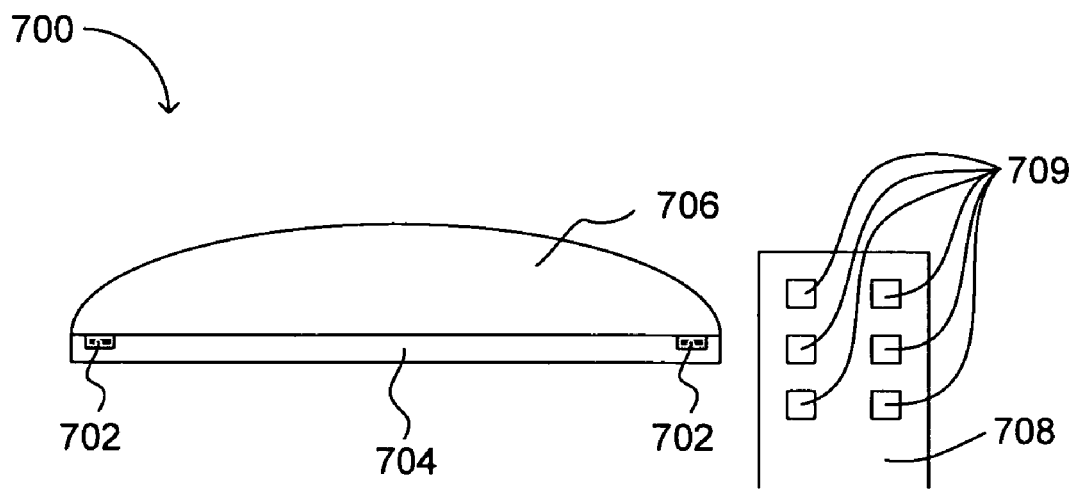
FIG. 7 is a schematic cross-sectional view of a lens mechanism whereby control of lens movement is by magnetic force in accordance with embodiments of the present invention.

FIG. 7 is a schematic cross-sectional view of an embodiment in which lens movement is controlled by magnetic force, shown and generally indicated by reference character 700 for a magnetically actuated lens movement mechanism formed, e.g., on a semiconductor substrate in accordance with MEMS fabrication methods. As shown in FIG. 7, electrically conductive coil 702 (one or more loops) is formed in layer 704 underlying lens 706. Coil 702 acts as a magnet if electrical current flows in coil 702. Coil 702 is, e.g., aluminum or titanium, and is positioned such that the coil is around the perimeter of lens 706 so that coil 702 does not block light passing through the center of lens 706. Electrically conductive traces between coil 702 and a current source (either on the semiconductor substrate or on, e.g., a separate integrated circuit chip) are not shown. In another embodiment, coil 702 is formed integral with lens 706 or in a layer overlying lens 706. In yet another embodiment, two or more coils 702 are used. One or more actuators 708 (only one is shown) contain magnets (e.g., electrically conductive loops 709 in which electrical current flows). As shown in FIG. 7, actuators 708 are positioned near the perimeter of lens 706. In other embodiments, actuators 708 are positioned over or under lens 706. The attractive or opposing magnetic force(s) between actuator(s) 708 and the force generated by coil 702 causes lens 706 to move, as described above. Various magnetic configurations are possible, including varying (discrete steps or analog) current in loop 702, varying (discrete steps or analog) current in one or more actuators 708, or replacing the electromagnets with fixed magnets (e.g., Nickel Iron compounds).

Although the invention has been described with respect to specific embodiments thereof, these embodiments are merely illustrative, and not restrictive, of the invention. For example, various other configurations are possible, such as the lens being positioned between the flexible support and the sensor, or the electrostatic layer being positioned over the lens, or the electrostatic layer being various shapes dissimilar to that of the lens's outline. The actuators 8 may be placed at various positions to the side, above, or below lens 2. Also, the invention is described in terms of MEMS technology, which although small is generally considered larger than molecular nanotechnology (structures less than approximately 100 nm). Embodiments include molecular nanotechnology structures.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits (ASICs), programmable logic devices (PLDs), field programmable gate arrays (FPGAs), optical, chemical, biological, quantum or nanoengineered systems, components and mechanisms may be used. In general, the functions of the present invention can be achieved by any means as is known in the art. Distributed, networked systems, and/or components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/FIGS. should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An apparatus, comprising:
a flexible support;
a lens supported by a support post on the flexible support, the lens being aligned with a first plane, the support post being aligned with an optical axis of the lens, the optical axis having a focus of the lens;
a sensor positioned to receive photons passing through the lens; and
an actuator separate from the flexible support and positioned near but not in contact with an edge of the flexible support and the lens such that a change in an electric charge on at least a portion of the actuator causes the lens to move to be aligned with a second plane, the second plane being substantially parallel to the first plane.

2. The apparatus of claim 1, further comprising an electrostatic layer coupled to the lens and the support post, wherein the electric charge on the actuator interacts with an electric charge, opposite in polarity to the electric charge on the actuator, on at least a portion of the electrostatic layer so as to cause the lens to move.

3. The apparatus of claim 1, further comprising an electrostatic layer coupled to the lens and the support post, wherein the electric charge on the actuator interacts with an electric charge, identical in polarity to the electric charge on the actuator, on at least a portion of the electrostatic layer so as to cause the lens to move.

4. The apparatus of claim 1, wherein the actuator includes a plurality of transistors.

5. The apparatus of claim 1, wherein the flexible support comprises a serpentine shape extending from the support post.

6. An apparatus, comprising:
a flexible support;
a lens supported by a support post on the flexible support, the lens being aligned with a first plane, the support post being aligned with an optical axis of the lens, the optical axis having a focus of the lens;
a sensor positioned to receive photons passing through the lens; and
an actuator separate from the flexible support and positioned near but not in contact with an edge of the flexible support and the lens such that a change in an electric charge on at least a portion of the actuator causes the lens to move to be aligned with a second plane, the second plane intersecting the first plane.

7. The apparatus of claim 6, further comprising an electrostatic layer coupled to the lens and the support post, wherein the electric charge on the actuator interacts with an electric charge, opposite in polarity to the electric charge on the actuator, on at least a portion of the electrostatic layer so as to cause the lens to move.

8. The apparatus of claim 6, further comprising an electrostatic layer coupled to the lens and the support post, wherein the electric charge on the actuator interacts with an electric charge, identical in polarity to the electric charge on the actuator, on at least a portion of the electrostatic layer so as to cause the lens to move.

9. The apparatus of claim 6, wherein the actuator includes a plurality of transistors.

10. The apparatus of claim 6, wherein the flexible support comprises a serpentine shape extending from the support post.

11. An apparatus, comprising:
a flexible support;
a lens supported by a support post on the flexible support, the lens being aligned with a first plane, the support post being aligned with an optical axis of the lens, the optical axis having a focus of the lens;
a sensor positioned to receive photons passing through the lens; and
an electrostatic layer positioned adjacent the lens such that a change in an electric charge on at least a portion of the electrostatic layer causes a change in an electric field that interacts with an electric field on a nearby actuator, the actuator being not in contact with the lens or the flexible support, and wherein the interaction between the electric fields causes the lens to move to be aligned with a second plane, the second plane being substantially parallel to the first plane.

12. The apparatus of claim 11, wherein the flexible support is substantially serpentine in shape, and extends from the support post.

13. An apparatus, comprising:
a flexible support;
a lens supported by a support post on the flexible support, the lens being aligned with a first plane, the support post being aligned with an optical axis of the lens, the optical axis having a focus of the lens;
a sensor positioned to receive photons passing through the lens; and
an electrostatic layer positioned adjacent the lens such that a change in an electric charge on at least a portion of the electrostatic layer causes a change in an electric field that interacts with an electric field on a nearby actuator, the actuator being not in contact with the lens or the flexible support, and wherein the interaction between the electric fields causes the lens to move to be aligned with a second plane, the second plane intersecting the first plane.

14. The apparatus of claim 13, wherein the flexible support comprises a serpentine shape extending from the support post.

15. A method, comprising:
positioning a lens via a support post on a flexible support, wherein an optical axis is associated with the lens, the support post is aligned with the optical axis, and the optical axis includes a focus of the lens; and
using an electrostatic force to move the lens from a first position to a second position, wherein the optical axis of the lens in the second position is substantially parallel with the optical axis of the lens in the first position.

16. A method, comprising:
positioning a lens via a support post on a flexible support, wherein an optical axis is associated with the lens, the support post is aligned with the optical axis, and the optical axis includes a focus of the lens; and
using an electrostatic force to move the lens from a first position to a second position, wherein the optical axis of the lens in the second position is tilted from the optical axis of the lens in the first position.

17. A method, comprising:
positioning a lens via a support post on a flexible support, wherein the support post is aligned with an optical axis of the lens, the optical axis having a focus of the lens; and
positioning an actuator proximate the lens, wherein the actuator touches neither the lens nor the flexible support, and wherein a change in an electrostatic charge on the actuator causes the lens to move from a first to a second position.

18. The method of claim 17, wherein the actuator is positioned proximate a perimeter of the lens near an edge of the flexible support and the lens.

19. A method, comprising:
using a magnetic force to move a lens from a first position to a second position, wherein the lens is positioned via a support post on a flexible support, the lens covering at least a portion of the flexible support, the support post being aligned with an optical axis of the lens, the optical axis having a focus of the lens.

20. The method of claim 19, wherein the optical axis of the lens in the second position is substantially parallel with the optical axis of the lens in the first position.

21. The method of claim 19, wherein the optical axis of the lens in the second position is tilted from the optical axis of the lens in the first position.

22. An apparatus, comprising:
a lens positioned via a support post on a flexible support, the lens covering at least a portion of the flexible support, the support post being aligned with an optical axis of the lens, the optical axis having a focus of the lens; and
an actuator positioned proximate the lens near an edge of the flexible support and the lens, wherein a magnetic force induced between the lens and the actuator causes the lens to move from a first position to a second position.

23. The apparatus of claim 22, wherein the optical axis of the lens in the second position is substantially parallel with the optical axis of the lens in the first position.

24. The apparatus of claim 22, wherein the optical axis of the lens in the second position is tilted from the optical axis of the lens in the first position.

25. The apparatus of claim 22, further comprising an image capture mechanism configured to receive an image via the lens.

26. A micromechanical structure, comprising:
a base;
a flexible support that is supported by the base;
a lens coupled to the flexible support via a support post, the support post being aligned with an optical axis of the lens, the optical axis having a focus of the lens; and
a plurality of actuators supported by the base, wherein the actuators are positioned around and not touching the lens or the flexible support, and wherein an electrical or magnetic field generated by one or more of the plurality of actuators causes the lens to move.

* * * * *